(12) United States Patent
Kamatani

(10) Patent No.: US 7,170,698 B2
(45) Date of Patent: Jan. 30, 2007

(54) MAGNETIC TRANSFER APPARATUS

(75) Inventor: Akito Kamatani, Kanagawa (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 228 days.

(21) Appl. No.: 10/366,711

(22) Filed: Feb. 14, 2003

(65) Prior Publication Data

US 2003/0161059 A1   Aug. 28, 2003

(30) Foreign Application Priority Data

Feb. 15, 2002 (JP) ............................. 2002-037713

(51) Int. Cl.
*G11B 5/86* (2006.01)
*G11B 23/03* (2006.01)

(52) U.S. Cl. ........................................ 360/17; 360/133
(58) Field of Classification Search .................. 360/15, 360/16, 17
See application file for complete search history.

(56) References Cited

U.S. PATENT DOCUMENTS 5,075,801 A * 12/1991 Chi et al. ..................... 360/17
6,469,848 B1 * 10/2002 Hamada et al. ............... 360/17
6,757,115 B2 * 6/2004 Kondo et al. .................. 360/15
6,906,875 B2 * 6/2005 Kamatani et al. ............. 360/17

FOREIGN PATENT DOCUMENTS

JP   11175973 A * 7/1999

* cited by examiner

*Primary Examiner*—Wayne Young
*Assistant Examiner*—Daniell L. Negrón
(74) *Attorney, Agent, or Firm*—Sughrue Mion, PLLC

(57) ABSTRACT

Disclosed is a magnetic transfer apparatus capable of performing good magnetic transfer, including a holder for accommodating a master carrier with transfer patterns corresponding to transfer information, a slave-feeding unit for feeding a slave medium with a magnetic recording part to be transferred to the master carrier, and a magnetic field application unit for applying a magnetic field in a state that the slave medium is in close contact with the master carrier, wherein the holder is provided with a slave holding shaft for positioning a central opening of the slave medium at a central portion thereof, and an inner diameter of the central opening of the slave medium is set to be smaller than that of a central opening the master carrier, and the slave-feeding unit holds an inner diameter portion of the slave medium. The inner diameter portion of the slave medium fed to the master carrier is sucked by use of suction grooves, and the slave medium is preferably brought into temporary contact with the master carrier.

13 Claims, 3 Drawing Sheets

MAGNETIC TRANSFER APPARATUS

BACKGROUND OF THE INVENTION

1. Field of the Invention

The present invention relates to a magnetic transfer apparatus for use in performing magnetic transfer from a master carrier having patterns corresponding to transfer information to a slave medium having a magnetic recording part, and in particular, to a magnetic transfer apparatus capable of accurately feeding the slave medium to the master carrier held in a holder.

2. Description of the Prior Art

Generally, a master carrier (patterned master) for magnetic transfer comprises transfer patterns such as servo signals in the form of surface irregularities or embedded structure, with at least a soft magnetic layer on a surface layer. Such a master carrier comes into close contact with a slave medium having a magnetic recording part, and a magnetic field for transfer is applied, whereby magnetic patterns corresponding to information carried on the master carrier are transferred to and recorded on the slave medium. Such technologies are disclosed in Japanese Patent Laid-open Publication No. Sho. 63-183623 and Nos. Hei. 10-40544 and 10-269566, and Japanese Patent Laid-open Publication No. 2001-256644 and like.

In cases where the slave medium is a disk-shaped magnetic recording medium such as a hard disk or high-density flexible disk, a transfer magnetic field is applied by a magnetic field application unit including an electromagnet device or permanent magnet device which is disposed at one side or both sides of the slave medium, in a state that a disk-shaped master carrier is kept in close contact with the slave medium.

As an important condition upon performing magnetic transfer, there is positioning of the master carrier and the slave medium with high accuracy. Particularly, in the slave medium such as a hard disk or high-density flexible disk, a rotation center thereof when being attached to a drive unit after magnetic transfer should be accurately aligned with a center of a recorded magnetic pattern.

In this regard, Japanese Patent Laid-open Publication No. Hei. 11-175973 and Japanese Patent Laid-open Publication No. 2001-209978 disclose a positioning process of a master carrier and a slave medium by use of an imaging unit when the slave medium comes into close contact with the master carrier. Specifically, the slave medium is set to a close contact flange, on which the master carrier having markers formed with transparent portions corresponding to patterns is placed. Then, while positions of the markers and the slave medium are observed by use of the image unit to be aligned, the master carrier is correctly positioned and comes into close contact with the slave medium. Alternatively, the master carrier may be set into the holder capable of moving in an X-Y direction, and may be brought into close contact with the slave medium after aligning them while being observed the center position thereof by use of a CCD camera.

Thus, there is proposed, by the present inventors, a technique of positioning a slave medium and a master carrier with high accuracy by previously positioning a center of transfer patterns of the master carrier relative to a center of a slave holding shaft (center pin) of the holder, and then positioning the slave medium by the slave holding shaft (Japanese Patent Application No. 2001-302231).

Meanwhile, the slave medium and the master carrier are set into the holder by horizontally conveying the slave medium onto the master carrier to be superimposed in up and down directions, or by vertically conveying the slave medium at any one side of the master carrier for perpendicular arrangement. However, the latter case of vertically conveying the slave medium suffers from the disadvantages such as dropping of the slave medium during conveyance, and penetration of dust into a gap between the contact surfaces of the slave medium and the master carrier in addition to above-mentioned positioning. Thus, it is preferable that the slave medium is fed while being held by a slave-feeding unit.

As such, in order to ensure the high quality of signal recording parts of the slave medium, any portion except for the signal recording parts of the slave medium should be held by the slave-feeding unit.

Meanwhile, in order to hold the slave medium in the holder during performing magnetic transfer, an inner diameter portion of a central opening of the slave medium is supported by use of the slave holding shaft. However, since the central opening of the slave medium is only hung around the slave holding shaft until being compressed upon transfer, the slave medium may be detached from the slave holding shaft due to vibration during handling. In addition, since a gap may be formed between the master carrier and the slave medium, environmental dust may be attached to the close contact surfaces of the master carrier and the slave medium to cause deterioration of transfer quality. Further, in the state of being tilted, an edge of the master carrier or the slave medium partially comes into strong contact with the slave medium or the master carrier during being compressed, thus damaging the slave medium or the master carrier, and causing poor transfer.

SUMMARY OF THE INVENTION

Therefore, it is an object of the present invention to solve the problems encountered in the prior art and to provide a magnetic transfer apparatus, which is advantageous in terms of precisely feeding a slave medium to a master carrier while preventing the poor transfer.

With the aim of achieving the above object, there is provided a magnetic transfer apparatus comprising a holder for accommodating a master carrier with transfer patterns corresponding to transfer information; a slave-feeding unit for feeding a slave medium with a magnetic recording part to be transferred to the master carrier; and a magnetic field application unit for applying a magnetic field in a state that the slave medium is in close contact with the master carrier, wherein an inner diameter of the central opening of the slave medium is set to be smaller than that of a central opening of the master carrier. Preferably, the holder is provided with a slave holding shaft at a center portion thereof for correctly positioning a central opening of the slave medium. Furthermore, the slave-feeding unit preferably holds an inner diameter portion of the slave medium.

That is, the inner diameter of the master carrier is set to be larger than that of the slave medium, and a difference between the inner diameters of the slave medium and the master carrier falls preferably in the range of 0.5–10 mm. In addition, it is preferred that the slave medium is held in the holder by the inner diameter difference portion thereof which is not overlapped by the master carrier during handling.

Before the slave medium is compressed onto the master carrier held in the holder, it is preferred that the slave medium comes into temporary contact with the master carrier by sucking air of the inner diameter difference portion of the slave medium.

After magnetic transfer, when the slave medium is separated from the master carrier, a pressing unit for supporting the master carrier to the holder may be additionally provided.

DETAILED DESCRIPTION OF THE PREFERRED EMBODIMENTS

Figure 1:
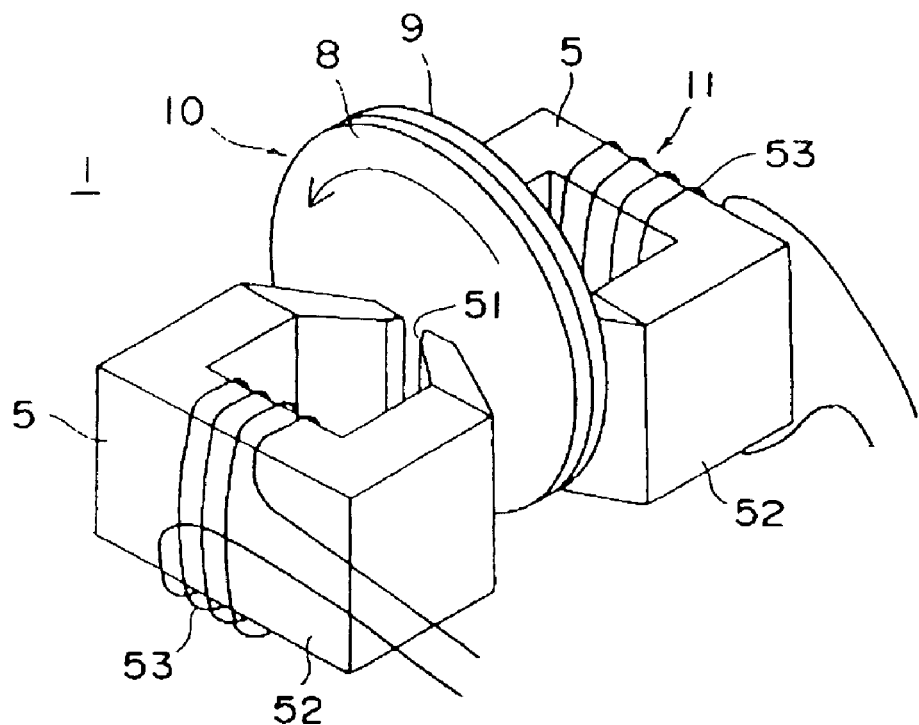
FIG. 1 is a perspective view of main parts showing a transfer state of a magnetic transfer apparatus according to an embodiment of the present invention.
Figure 2:
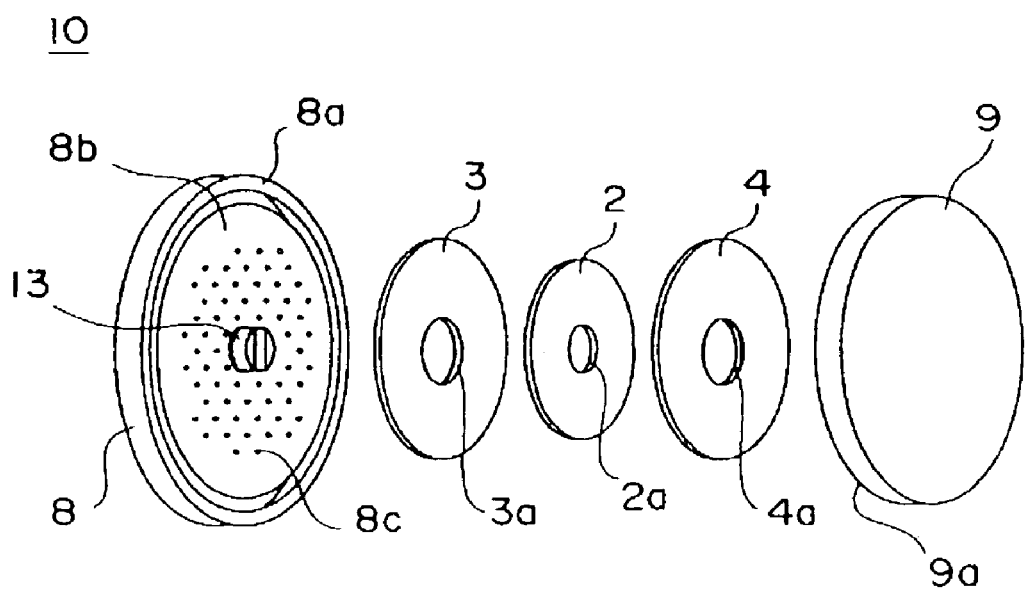
FIG. 2 is an exploded perspective view of a holder.
Figure 3:
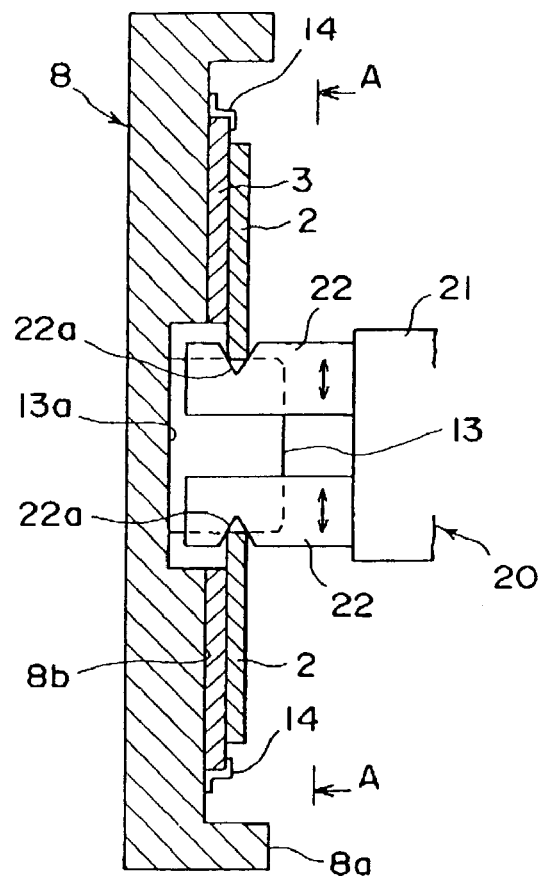
FIG. 3 is a cross-sectional view showing a feeding state of a slave medium to the opened holder.
Figure 4:
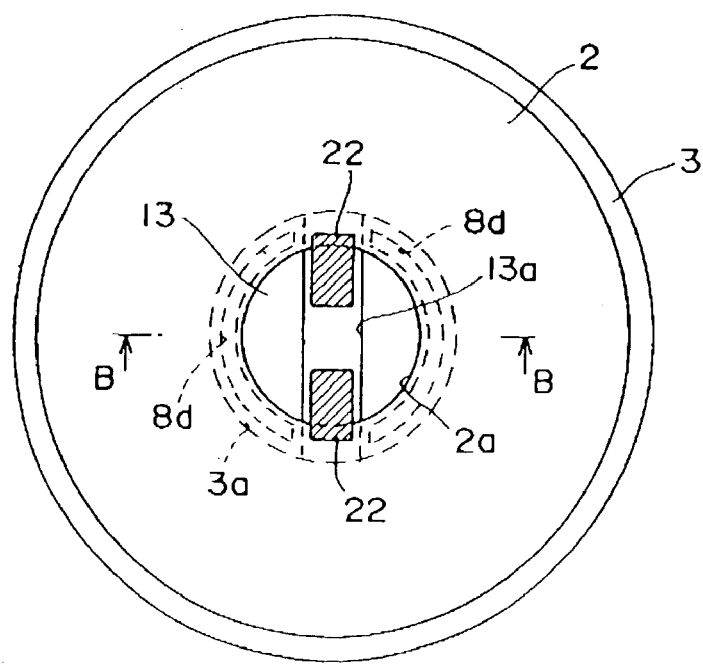
FIG. 4 is a sectional front view of main parts taken along a line A—A of FIG. 3.
Figure 5:
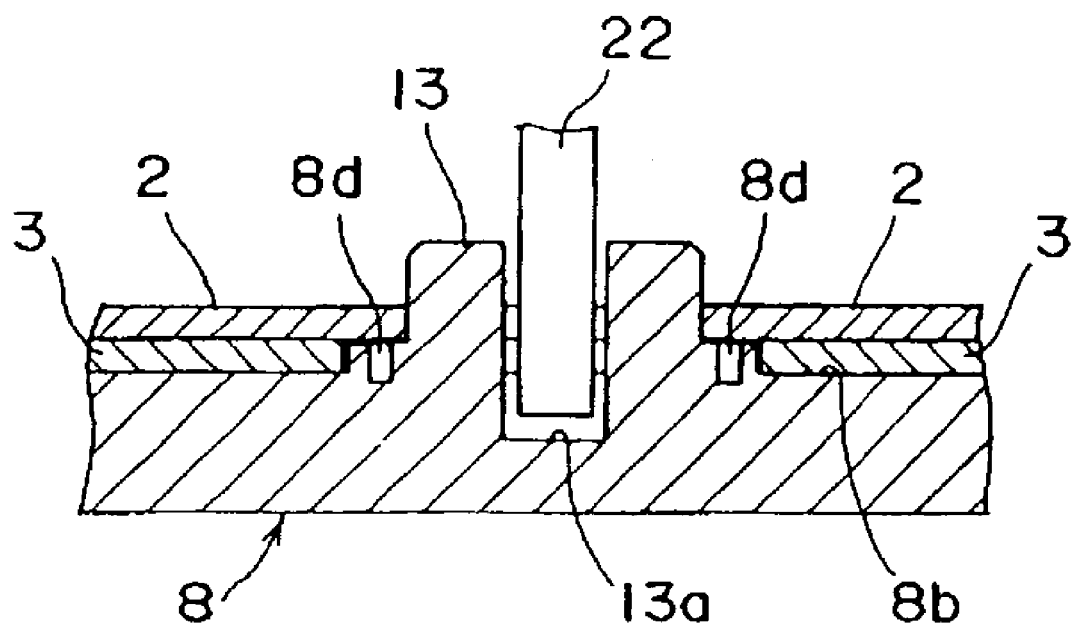
FIG. 5 is a cross-sectional view of main parts taken along a line B—B of FIG. 4.

Now, a preferred embodiment of a magnetic transfer apparatus of the present invention will be described below with reference to the accompanying drawings. In FIG. 1, there is shown a perspective view of main parts showing a transfer state of the magnetic transfer apparatus according to an embodiment of the present invention. An exploded perspective view of the holder is shown in FIG. 2. A cross-section showing a feeding state of a slave medium is seen in FIG. 3, and a sectional front view of main parts taken along a line of A—A of FIG. 3 is shown in FIG. 4. Further, FIG. 5 shows a cross-section of main parts taken along a line of B—B of FIG. 4.

By use of a magnetic transfer apparatus 1 shown in FIGS. 1 and 2, master carriers 3 and 4, which have transfer patterns corresponding to servo signals, come into close contact with both recording surfaces of a slave medium 2 (magnetic recording medium), to which a magnetic field for transfer is applied, thus performing magnetic transfer. The magnetic transfer apparatus 1 comprises a holder 10 which holds two master carriers 3 and 4 within the inner space thereof and closely contact them with both surfaces of the slave medium 2 while orienting information-carried surfaces perpendicularly. Further, the magnetic transfer apparatus 1 includes a slave medium feeding unit 20 (e.g., robot hand) partially shown in FIG. 3 for feeding the slave medium 2 to the holder 10 while orienting recording surface perpendicularly, a magnetic field application unit 11 for applying a transfer magnetic field while rotating the holder 5, and a vacuum suction means, which is not shown, for sucking air in an inner space of the holder 10 to provide a vacuum condition and generate a close contacting force.

The holder 10 is provided with a base chamber casing 8 which holds a first master carrier 3 transferring information such as servo signals on any one recording surface of the slave medium 2, and a compression chamber casing 9 which holds a second master carrier 4 transferring information such as servo signals on the other recording surface of the slave medium 2. The base chamber casing 8 and the compression chamber casing 9 are arranged to move relative to each other by a moving mechanism which is not shown, so that the casings 8 and 9 are engaged with and separated from each other.

The slave medium 2 is a circular disk-shaped hard disk having a central opening 2a of a predetermined diameter, and comprises recording surfaces formed with magnetic layer at both sides of a disk-shaped base made of glass plate or the like. A diameter of the central opening 2a of the slave medium 2 is set to be smaller than that of a central opening 3a of the first master carrier 3. While an inner diameter portion (a non-overlapped portion of the inner diameter of the slave medium 2 with the master carrier 3) is held with the recording surfaces thereof oriented perpendicularly, the slave medium 2 is positioned relative to the first master carrier 3 which is seated on the base chamber casing 8 of the holder 10 in the state of being separated from the compression chamber casing 9, by use of the slave-feeding unit 20. The slave medium 2 may be a high-density flexible disk.

The diameter difference of the central openings 2a and 3a of the slave medium 2 and the master carrier 3 is in the range of 0.5–10 mm. If such a difference is less than 0.5 mm, there is no portion by which the slave medium 2 can be held or supported. Meanwhile, if the diameter difference exceeds 10 mm, the signal recording part of the slave medium 2 is damaged by the edge of the master carrier 3. In addition to case of feeding the slave medium 2 to the holder 10, it is preferred that the slave medium 2 is held at the inner diameter difference portion during handling.

The first master carrier 3 and the second master carrier 4 are formed to a disk shape, and have central openings 3a and 4a. Additionally, any one surface of each of the two master carriers 3 and 4 comprises transfer patterns made of a soft magnetic layer in the form of fine surface irregularities, which comes into close contact with the recording surface of the slave medium 2. The other surface of each of the master carriers 3 and 4 is held in the base chamber casing 8 and the compression chamber casing 9.

As shown in FIG. 3, the base chamber casing 8 is provided with a slave holding shaft 13 for positioning the central opening 2a of the slave medium 2 at a center position thereof, and provided with an inner surface for suction 8b for holding the first master carrier 3 around the outer periphery of the slave holding shaft 13. The master carrier 3 is positioned with being previously controlled so that a central position of transfer patterns is aligned with that of the slave holding shaft 13. The slave medium 2 is positioned with respect to the master carrier 3 by fitting the central opening 2a of the slave medium 2 around the slave holding shaft 13.

In this regard, the magnetic transfer apparatus preferably comprises a means for detecting a position of the slave medium and a means for adjusting a position of the slave medium, and the inner diameter portion of the slave medium 2 is held by suction in a state that the position of the slave medium 2 has adjusted by the means for detecting a position of the slave medium and the means for adjusting a position of the slave medium.

As for the inner surface 8b of the base chamber casing 8, suction holes 8c (FIG. 2) are uniformly formed at the inner surface corresponding to a size of the master carrier 3, by which the first master carrier 3 is kept in the state being sucked. Although not shown, an inner surface of the compression chamber casing 9 holds the second master carrier 4 as in the base chamber casing 8. A cushion member for evenly dispersing compressing force may be attached to the inner surface of the compression chamber casing 9, on which the second master carrier 4 may be held.

Positioning of the master carrier 3 relative to the slave holding shaft 13 is determined by minutely adjusting the position of the master carrier 3 in an X-Y direction with the use of a position observing means such as a microscope or CCD camera. Alternatively, the master carrier 3 may be positioned while being manually or automatically adjusted by a fine focus unit, of which one example is described in Japanese Patent Application No. 2001-302231 by the present applicant.

One or both of the base chamber casing 8 and the compression chamber casing 9 are installed to be movable axially. On outer circumferences of both chamber casings 8 and 9, flanges 8*a* and 9*a* are formed. Upon closing, both chamber casings 8 and 9 are sealed by a sealing mechanism which is not shown. Further, the base chamber casing 8 and the compression chamber casing 9 are connected to rotation mechanism which is not shown and rotated together upon application of magnetic field.

As for the inner space of the holder 10, suction ports of the vacuum suction means (not shown) are opened and connected to a vacuum pump. Through vacuum suction of air, the inner space of the holder 10 is controlled to a predetermined vacuum level. Thereby, the slave medium 2 and the master carriers 3 and 4 are brought into close contact with one another with the predetermined contacting pressure. A net area of vacuum suction region of the inner space of the holder 10 is formed to be 2–3 times larger than contact area of the slave medium 2 and the master carriers 3 and 4 to increase the contacting force, thus obtaining the predetermined contacting pressure depending on vacuum levels. Further, the contacting pressure may be obtained by an additional compression unit which applies mechanical pressure relative to the compression chamber casing 9.

The magnetic field application unit 11 comprises electromagnet devices 5, 5 disposed at both sides of the holder 10, and the electromagnet device 5 comprises a coil 53 wound around a core 52 with a gap 51 extending to a radial direction of the holder 10. A direction of magnetic lines of force acting at the gap 51 is parallel to a track direction (in case of in-plane recording) of the slave medium 2 held in the holder 10. As the magnetic field application unit 11, permanent magnet devices may be used instead of the electromagnet devices.

As for the magnet field application unit 11, the electromagnet devices 5 are moved toward and away from both sides of the holder 10, or the electromagnet devices 5 or the holder 10 may be moved so as to insert the holder 10 between the electromagnet devices 5, thus permitting the opening or closing of the holder 10.

As shown in FIG. 3, the slave-feeding unit 20 (robot hand) for feeding the slave medium 2 to the base chamber casing 8 of the opened holder 8 is equipped with two slave-grasping claws 22 at a front end of an arm 21. The claws 22 grasp the slave medium 2 and set the slave medium 2 to the slave holding shaft 13. The space between the slave-grasping claws 22 is increased or decreased by a drive unit not shown. The slave-grasping claws 22 are inserted into the central opening 2*a* of the slave medium 2, and the space therebetween is increased to grasp the inner diameter portion of the slave medium 2 and is decreased to release the slave medium 2. Each slave-grasping claw 22 is provided with a holding notch 22*a* for holding the slave medium 2 to control the holding position of the slave medium 2.

The slave holding shaft 13 of the base chamber casing 8 has a constitution such that it does not interfere with slave-grasping claw 22 during feeding the slave medium 2. Namely, as shown in FIGS. 4 and 5, at the slave holding shaft 13, a recess 13*a* is formed along a diameter of the shaft 13 to receive the slave-grasping claws 22 therein and to allow the increase or decrease of the space between the slave-grasping claws 22. The recess 13*a* may be formed in the suction grooves 8*d* which is described in the below. The slave-grasping claws 22 are received in the recess 13*a* and the space therebetween is increased or decreased in a radial direction, thereby preventing operations of the slave holding shaft 13 and the slave-grasping claws 13*a* from interfering with each other.

When the slave medium 2 is fed to the master carrier 3 by the slave-feeding unit 20, the slave medium 2 is sucked toward the master carrier 3 and surfaces of the slave medium 2 and the master carrier 3 are held in temporary contact. Specifically, as shown in FIGS. 4 and 5, in the inner surface 8*b* of the base chamber casing 8, circular arc-shaped suction grooves 8*d* are formed around the slave holding shaft 13, each of which is positioned inwardly from the edge of the central opening 3*a* of the master carrier 3 except for the extension of the recess 13*a*. Such suction grooves 8*d* are connected to a vacuum pump through an air channel not shown. By air suction force affecting at the suction grooves 8*d*, the non-overlapped portion of the inner diameter between the central opening 2*a* of the slave medium 2 and the central opening 3*a* of the master carrier 3 is sucked to the master carrier 3, and comes into temporary contact with the master carrier 3.

In this regard, the magnetic transfer apparatus may comprise a means for reducing a pressure of an inner space of the holder, and pressure of the inner space of the holder is set to be higher than suction pressure of the non-overlapped portion of the inner diameter of the slave medium.

Conventionally, before the fed slave medium 2 is compressed after feeding, the slave medium 2 may be detached from the master carrier 3 or the slave medium 2 and the master carrier 3 may be tilted, thus admitting impurities into the gap between the slave medium 2 and the master carrier 3. Further, the slave medium 2 may be abraded due to friction with the slave holding shaft 13 or be damaged by edge contact upon compression. However, in the present invention, temporary contact as mentioned above results in solving the above problems.

After magnetic transfer, when the slave medium 2 is separated from the master carrier 3, there is provided a pressing unit 14 for mechanically holding the master carrier 3 to the holder 10. For instance, the pressing unit 14 comprises a pressing member (fixing member) which holds outer circumferential portion of the master carrier 3 onto the inner surface 8*b* of the base chamber casing 8 in case where an outer diameter of the master carrier 3 is formed to be larger than that of the slave medium 2. In addition, the master carrier 3 may be held stationary by the pressing unit 14 only upon separation of the slave medium 2 from the master carrier 3.

Thereby, upon separation of the slave medium 2, the master carrier 3 is prevented from being separated together with the slave medium 2 from the holder 10.

In addition to simultaneous magnetic transfer to both surfaces of the slave medium 2 as explained in the above, magnetic transfer to a single surface may be performed. In such a case, it is preferred that a single master carrier 3 which transfers information, such as servo signals, to any one recording surface of the slave medium 2 is seated on the base chamber casing 8 of a holder 10 and an elastic member (cushion member), which comes into contact with the other recording surface of the slave medium 2, is seated on compression chamber casing 9. The slave medium 2 is fed to the slave holding shaft 13 of the base chamber casing 8 by the slave-feeding unit 20 as explained in the above.

When the magnetic transfer is performed, the slave medium 2 is subjected to initial DC magnetization in an in-plane track direction in case of in-plane recording or in a perpendicular direction in case of perpendicular recording. Such a slave medium 2 comes into close contact with the mater carriers 3 and 4, and a transfer magnetic field is applied to a track direction or perpendicular direction approximately opposite to the direction of initial DC magnetization.

As the slave medium 2, a disk-shaped magnetic recording medium is used, for example, a hard disk with a magnetic recording part (magnetic layer) formed on both surfaces or a single surface thereof. The magnetic recording part comprises a magnetic recording layer of a coating type or a metal thin film type.

The master carriers 3, 4 are formed of circular disk. The master carriers 3, 4 have transfer magnetic patterns which are formed by coating a soft magnetic material on fine surface irregularity patterns formed on a substrate. The substrates of the master carriers 3 and 4 are made of any material selected from among nickel, silicon, quartz plate, glass, aluminum, alloy, ceramics or synthetic resin. Patterns of the surface irregularities are formed by means of a stamper method and the like. The soft magnetic material is obtained by subjecting a magnetic material to vacuum film formation method such as vacuum vapor deposition, sputtering or ion plating, and plating method. The master carriers used for in-plane recording are similar to those for perpendicular recording.

The magnetic field application unit 11 applies a magnetic field and, as necessary, an initial magnetic field to the holder 10. In case of in-plane recording, the ring type head electromagnet devices 5 as mentioned above are disposed at both sides of the holder 10 to apply the transfer magnetic fields parallel to a track direction to both sides of the holder 10. With rotation of the holder 10, the transfer magnetic field is applied to the whole surfaces of the slave medium 2 and the master carriers 3 and 4. Alternatively, the magnetic field application unit may be installed to rotate the magnetic field. The magnetic field application unit 11 may be disposed at any one side of the holder 10, and permanent magnet devices may be disposed at any one side or both sides thereof. In case of perpendicular recording, electromagnet devices or permanent magnet devices having different polarities are disposed at both sides of the holder 10, and the transfer magnetic field is generated in a perpendicular direction and applied to the holder 10. For partial application of the magnetic field, the holder 10 or the magnetic field may be moved, thus performing magnetic transfer on the whole surfaces.

According to above-described embodiment, the slave medium 2 is accurately fed to the master carrier 3 and poor transfer is prevented.

As described above, when the central opening of the slave medium fed by the slave-feeding unit is fitted around the slave holding shaft and the slave medium is fed to and positioned with respective to the master carrier seated in the holder, the diameter of the central opening of the slave medium is set to be smaller than that of the central opening of the master carrier, and the inner diameter portion of the slave medium is held by the slave-feeding unit. Consequently, even in vertical feeding of the slave medium, the slave medium may be fed to the slave holding shaft while the inner diameter thereof is supported, resulting in that the slave medium is securely held around the slave holding shaft. Further, there are no problems such as falling of the slave medium during conveyance thereof and penetration of dust into a gap between the slave medium and the master carrier.

Before being compressed by the master carrier set in the holder, the slave medium comes into temporary contact with the master carrier by sucking air of the non-overlapped portion of the inner diameter of the slave medium and the master carrier. Thereby, the slave medium is not detached from the maser carrier due to vibration during handling, and no gap is formed between the slave medium and the master carrier. In addition, environmental dust is not attached to the contact surfaces of the master carrier and the slave medium, thus ensuring high transfer quality. Further, without being tilted, such temporary contact is performed in the planar state, whereby an edge of the master carrier or the slave medium does not come into strong contact locally with the slave medium or the master carrier, thus obtaining good transfer quality without damaging the slave medium or master carrier.

On the other hand, the outer diameter of the master carrier is set to be smaller than that of the slave medium, and a holding portion for supporting the slave medium may be formed at an outer edge portion of the slave medium. However, in such a case, the slave medium may be damaged, and may be deformed due to a holding force applied to the outer edge portion, thus lowering the flatness of the slave medium, causing poor contact between the slave medium and the master carrier. This is because the signal recording part of the slave medium extends until near the outer edge portion thereof to increase recording capacity. However, in the present invention, since the slave medium is held using the difference between the inner diameters of the slave medium and the master carrier, it is accurately fed to the holder while avoiding the above problems.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A magnetic transfer apparatus, comprising:
   a holder for accommodating master carriers with transfer patterns corresponding to transfer information;
   a slave-feeding unit for feeding a slave medium with a magnetic recording part to be transferred to the master carriers; and
   a magnetic field application unit for applying a transfer magnetic field in a state that both faces of the slave medium are in close contact with and between the master carriers to perform magnetic transfer,
   wherein an inner diameter of the central opening of the slave medium is set to be smaller than that of a central opening of one of the master carriers.

2. The magnetic transfer apparatus according to claim 1, wherein the holder is provided with a slave holding shaft for positioning a central opening of the slave medium at a central portion thereof.

3. The magnetic transfer apparatus according to claim 1, further comprising a means for detecting a position of the slave medium and a means for adjusting a position of the slave medium, wherein the inner diameter portion of the slave medium is held by suction in a state that the position of the slave medium has adjusted by the means for detecting a position of the slave medium and the means for adjusting a position of the slave medium.

4. The magnetic transfer apparatus according to claim 1, wherein the slave-feeding unit holds an inner diameter portion of the slave medium.

5. The magnetic transfer apparatus according to claim 1, wherein a diameter difference between the central opening of the slave medium and the central opening of the one of the master carriers is in the range of 0.5–10 mm.

6. The magnetic transfer apparatus according to claim 1, wherein before the slave medium is compressed onto the one of the master carriers held in the holder, the slave medium comes into temporary contact with the one of the master carriers by sucking air of a non overlapped portion of the inner diameter of the slave medium and the one of the master carriers.

7. The magnetic transfer apparatus according to claim 1, further comprising a pressing unit for supporting the master carriers to the holder when the slave medium is separated from the master carriers after magnetic transfer.

8. The magnetic transfer apparatus according to claim 1, further comprising a means for reducing a pressure of an inner space of the holder, wherein pressure of the inner space of the holder is higher than suction pressure of a non-overlapped portion of the inner diameter of the slave medium.

9. The magnetic transfer apparatus according to claim 4, wherein suction grooves for suctioning the slave medium are formed in a base chamber casing of the holder, and a recess is formed in the slave holding shaft or the suction grooves to receive the slave-grasping claws therein and to allow the increase or decrease of the space between the slave-grasping claws.

10. The magnetic transfer apparatus according to claim 1, wherein the slave medium comes into temporary contact with the one of the master carriers by sucking air over a non-overlapped portion of the inner diameter of the slave medium and the one of the master carriers, to pull the slave medium toward the one of the master carriers.

11. The magnetic transfer apparatus according to claim 1, wherein the holder comprises at least one suction hole disposed over a non-overlapped portion of the inner diameter of the slave medium and the one of the master carriers.

12. The magnetic transfer apparatus according to claim 11, wherein the at least one suction hole comprises two suction holes.

13. The magnetic transfer apparatus according to claim 11, wherein the at least one suction hole pulls the slave medium toward the one of the master carriers.

* * * * *